(12) United States Patent
Dempsey

(10) Patent No.: US 7,309,433 B2
(45) Date of Patent: Dec. 18, 2007

(54) FLUID BED EXPANSION AND FLUIDISATION

(75) Inventor: Michael John Dempsey, Manchester (GB)

(73) Assignee: Advanced Bioprocess Development Limited, Manchester (GB)

( * ) Notice: Subject to any disclaimer, the term of this patent is extended or adjusted under 35 U.S.C. 154(b) by 215 days.

(21) Appl. No.: 10/492,495

(22) PCT Filed: Oct. 9, 2002

(86) PCT No.: PCT/GB02/04640

§ 371 (c)(1),
(2), (4) Date: Sep. 29, 2004

(87) PCT Pub. No.: WO03/033411

PCT Pub. Date: Apr. 24, 2003

(65) Prior Publication Data

US 2006/0186041 A1    Aug. 24, 2006

(30) Foreign Application Priority Data

Oct. 11, 2001 (GB) ................. 0124433.4

(51) Int. Cl.
C02F 3/06 (2006.01)
(52) U.S. Cl. .............. 210/605; 210/618; 210/621; 210/630; 210/151; 210/194; 210/903
(58) Field of Classification Search ............... 210/617, 210/618, 605, 614, 621, 630, 150, 151, 96.1, 210/194, 903
See application file for complete search history.

(56) References Cited

U.S. PATENT DOCUMENTS 3,846,289 A * 11/1974 Jeris ........................... 210/618
3,956,129 A    5/1976 Jeris et al.
4,009,098 A    2/1977 Jeris (Continued)

FOREIGN PATENT DOCUMENTS

DE    44 42 126    5/1996

(Continued)

OTHER PUBLICATIONS

Asif, Kalogerakis and Behie, "Distributor Effects in Liquid Fluidized Beds of Low-Density Particles", AIChE Journal, Dec. 1991, vol. 37, No. 12, pp. 1825-1832.

(Continued)

*Primary Examiner*—Christopher Upton
(74) *Attorney, Agent, or Firm*—Alston & Bird LLP

(57) ABSTRACT

Method and apparatus (8) in which a biomass is carried on a substrate which is fluidised. The fluidised substrate has below it a lazer of distributor particles through which the fluidising medium passes prior to contact with the fluidised substrate and biomass associated therewith. The effect of the distributor layer is that the particles damp out excessive turbulence in the fluidising medium thus preventing undue turbulence of the medium within the fluidised layer. This has the advantage of controlling, to some extent, the thickness of the biofilm, which may be carried by the fluidised substrate particles. The particles may be recycles (1, 2, 5) through the distributor layer where the action of the distributor particles serve to strip exces biofilm from the substrate particles which latter are then returned to the fluidised bed.

29 Claims, 10 Drawing Sheets

1. Hopper for overflow of thickly-coated particles
2. Delivery pipe, for thickly-coated particles
3. Venturi, for injection of thickly-coated particles into turbulent inlet region

U.S. PATENT DOCUMENTS

| | | | |
|---|---|---|---|
| 4,009,099 A | | 2/1977 | Jeris |
| 4,009,105 A | | 2/1977 | Jeris |
| 4,177,144 A | * | 12/1979 | Hickey et al. ............... 210/618 |
| 4,202,774 A | | 5/1980 | Kos |
| 4,241,021 A | | 12/1980 | Skrzec |
| 4,250,033 A | * | 2/1981 | Hickey et al. ............... 210/618 |
| 4,322,296 A | | 3/1982 | Fan et al. |
| 4,464,262 A | | 8/1984 | Owens et al. |
| 4,490,258 A | | 12/1984 | Heijnen et al. |
| 4,618,418 A | | 10/1986 | Heijnen et al. |
| 4,702,891 A | | 10/1987 | Li et al. |
| 4,707,252 A | * | 11/1987 | Durot et al. ................. 210/151 |
| 4,762,612 A | * | 8/1988 | Yoda et al. .................. 210/150 |
| 4,800,021 A | * | 1/1989 | Desbos ........................ 210/605 |
| 4,869,815 A | * | 9/1989 | Bernard et al. ............. 210/151 |
| 4,933,149 A | | 6/1990 | Rhee et al. |
| 5,019,268 A | * | 5/1991 | Rogalla ....................... 210/617 |
| 5,228,997 A | * | 7/1993 | Martin et al. ............... 210/617 |
| 5,372,712 A | * | 12/1994 | Petit ............................ 210/618 |
| 5,584,996 A | | 12/1996 | Petit |
| 5,705,057 A | * | 1/1998 | Hoffa .......................... 210/150 |
| 5,747,311 A | | 5/1998 | Jewell |
| 5,849,194 A | * | 12/1998 | Yamasaki et al. ........... 210/618 |
| 5,895,576 A | | 4/1999 | Yamasaki et al. |
| 5,965,016 A | | 10/1999 | Suchowski et al. |
| 5,976,365 A | * | 11/1999 | Petit ............................ 210/618 |
| 5,985,149 A | * | 11/1999 | Raetz et al. ................. 210/617 |
| 6,572,773 B1 | * | 6/2003 | Dempsey .................... 210/151 |

FOREIGN PATENT DOCUMENTS

| | | |
|---|---|---|
| EP | 0 007 783 A1 | 7/1979 |
| EP | 0 861 808 A2 | 9/1998 |
| FR | 2 344 801 | 10/1977 |
| GB | 780 406 | 7/1957 |
| GB | 1 520 895 | 8/1978 |
| GB | 2 149 683 A | 6/1985 |
| JP | 58 199038 | 11/1983 |

OTHER PUBLICATIONS

Otton, Hihn, Béteau, Delpech and Chéruy, "Axial dispersion of liquid in fluidised bed with external recycling: two dynamic modelling approaches with a view to control", Biochemical Engineering Journal, vol. 2 (2000), pp. 129-136.

Finette, Mao, and Hearn, "Studies on the expansion characteristics of fluidised beds with silica-based adsorbents used in protein purification", Journal of Chromatography A. 743 (1996), pp. 57-73..

Koh, Wang and Wankat, "Ion Exchange of Phenylalanine in Fluidized/Expanded Beds", Ind. Eng. Chem. Res., 1995, vol. 34, pp. 2700-2711.

Kkumar, Kusakabe and Fan, "Heat Transfer in Three-Phase Fluidized Beds Containing Low-Density Particles," Chemical Engineering Science, vol. 48, No. 13, 1993, pp. 2407-2418.

Asif, Kalogerakis and Behie, "Hydrodynamics of Liquid Fluidized Beds Including the Distributor Region," Chemical Engineering Science, vol. 47, No. 15/16, 1992, pp. 4155-4166.

Sosa, Ochoa and Perotti, "Modeling of direct recovery of lactic acid from whole broths by ion exchange adsorption," Bioseparation, vol. 9, 2001, pp. 283-289.

Kiared, Larachi, Cassandello and Chaouki, "Flow Structure of the Solids in a Three-Dimensional Liquid Fluidized Bed," Ind. Eng. Chem. Res., vol. 36, 1997, pp. 4695-4704.

Nicolella, Felice and Rovatti, "An Experimental Model of Biofilm Detachment in Liquid Fluidized Bed Biological Reactors," Biotechnology and Bioengineering, vol. 51, 1996, pp. 713-719.

Sutton and Mishra, "Activated Carbon Based Biological Fluidized Beds for Contaminated Water and Wastewater Treatment: A State-of-the-art Review", Wat. Sci. Tech., vol. 29, No. 10-11 (1994), pp. 309-317.

Nicolella, Van Loosdrecht and Heunen, "Wastewater treatment with particulate biofilm reactors", Journal of Biotechnology, vol. 80 (2000), pp. 1-33.

Cooper and Wheeldon, "Complete treatment of sewage in a two-fluidised bed system", Biological Fluidised Bed Treatment of Water and Wastewater © 1981, Market Cross House, West Sussex, England, Chapter 7.

Coulom, Longeaux, Badard, and Sibony, "A Fluidized-Bed Reactor: The Biolift Process", Wat. Sci. Tech., vol. 29, No. 10-11 (1994), pp. 329-338.

Denae, Uzman, Tanaka, and Dunn, "Modeling of Experiments on Biofilm Penetration Effects in a Fluidized Bed Nitrification Reactor", Biotechnology and Bioengineering, vol. XXV (1983), pp. 1841-1861.

International Search Report for PCT/GB02/04640 completed Jan. 31, 2003.

* cited by examiner

1. Hopper for overflow of thickly-coated particles

2. Delivery pipe, for thickly-coated particles

3. Venturi, for injection of thickly-coated particles into turbulent inlet region

FLUID BED EXPANSION AND FLUIDISATION

BACKGROUND OF THE INVENTION

This invention relates to improvements in the design and operation of expanded or fluidised beds in which a fluid, particularly a liquid, is used to transmit the energy for bed expansion. An expanded or fluidised bed is one in which the particles are suspended in a fluid flow but do not substantially move with the bulk flow of that fluid. The classical chemical engineering definition of an expanded bed is one that is increased in volume up to 50 or 100% over that of the bed when static, i.e. with no fluid flow; whilst a fluidised bed is defined as having a volume more than 50 or 100% greater than that of the static bed with no fluid flow. In particular, it relates to biological processes such as water and wastewater treatment, fermentation, and bio-catalysis. For such processes, areas in need of improvement include distribution of the liquid flow; energy costs for pumping and aeration; control of biomass overgrowth; and biomass support materials.

Recent publications in the scientific literature have highlighted aspects of fluidised bed design and operation, which are in need of improvement. For example, P. M. Sutton and P. N. Mishra ("Activated carbon based biological fluidised beds for contaminated water and wastewater treatment: a state of the art review", Water Science and Technology Vol. 29 10-11: 309-317, 1994) point out that "The mechanical components and sub-systems critical to the design of BFB (biological fluidised bed) commercial system embodiments are the following" and went on to cite the distributor, oxygen transfer, and control of biofilm growth. Their paper was based on a review of "Over 80 commercial, media-based BFB reactors (that) have been installed in North America and Europe."

In a more recent review, C. Nicolella, M. C. M. van Loosdrecht and J. J. Heijnen ("Wastewater treatment with particulate biofilm reactors", Journal of Biotechnology 80: 1-33, 2000) identified four key disadvantages of fluidised bed operation:
1. Biofilm formation on carriers, which poses problems leading to long start-up times.
2. Difficulty in control of biofilm thickness.
3. Overgrowth of biofilm leading to elutriation of particles.
4. High cost of liquid distributors for fluidised systems for large-scale reactors and associated problems with respect to clogging and uniform fluidisation."

Since the introduction of liquid fluidised bed technology, a number of patents have been granted for devices to ensure the uniform distribution of liquid flow at the base of the bed. These include downward flow through expansion nozzles (e.g. U.S. Pat. Nos. 4,202,774, 4,464,262, 4,618,418, 5,584,996); nozzles with a perforated grid or plate above (U.S. Pat. Nos. 4,702,891, 4,933,149); perforated distributor plates, similar to those used in conventional gas-fluidised systems (U.S. Pat. No. 4,322,296) or with a static bed of coarse and fine grades of sand above (U.S. Pat. No. 5,965,016); or simply a static bed of granular material (U.S. Pat. No. 5,895,576), sand (GB780406) or both (GB2149683).

If the fluid flow at the base of the bed is turbulent, this results in increased impacts between fluidised particles producing abrasion, or in the case of particles carrying a reactant layer, premature stripping of the reactant layer from the fluidised carrier particles.

GB780406 discloses a particulate distributor comprising a static bed of sand lying on a perforated screen with flow rates of the order of 1 gallon per square foot per minute or about 0.08 cm per $cm^2$ per sec. This low rate of flow through the distributor is insufficient to cause movement of its particles, and the teaching here is that the granular material is being used in effect as a "3-dimensional" perforated plate. In an attempt to improve the fluid flow characteristic in a fluidised bed, Bernard Suchowski, Joseph E. Gargas, Robert H. Hyde and Joseph Pluchino (U.S. Pat. No. 5,965,016); proposed the use of larger and heavier particles of sand collected just above a perforated distributor plate, where they help distribute the flow more evenly.

In spite of this, the presence of the perforated plate itself poses physical constraints to fluid flow.

We have found that by removing the plate completely and causing or allowing the particles of the distributor layer to move, but not themselves to be fluidised, a significant improvement in fluid flow properties in the lower part of the bed results.

BRIEF SUMMARY OF THE INVENTION

In one aspect of the present invention there is provided, a method for improving the performance of a fluidised bed in which a bed of particulate material is fluidised by the passage of a fluidising medium there through, characterised by the provision of a distributor layer through which the fluidising medium is caused or allowed to pass prior to passing through the fluidised bed, the density of the particles of the distributor layer and the flow rate of the fluidising medium being selected such that turbulence in the fluidising medium is substantially reduced or eliminated before acting on the fluidised bed.

In a particular aspect of the present invention, a reactant moiety of the fluidised bed may be carried as a film or layer on a particulate carrier. In this particular case, the thickness of the reactant layer on the inert carrier medium may be controlled by allowing particles containing excess of reactant on the surface to be removed from the upper part of the fluidised bed to be recycled into the distributor layer, whereby excess biomass material is stripped from the carrier particles by the action of the distributor layer as the carrier particles pass there through towards the fluidised bed. Moreover, it has also been observed that biofilm thickness control can be achieved without recycling particles from one end of the bed to the other end.

Interactions at the interface between the moving bed distributor and the fluidized bed cause stripping of excess biofilm, resulting in a more compact biofilm. Evidence for the more compact nature of the biofilm arises from observations that the degree of bed expansion reduced (from 117.5 to 98.0 cm) but the static bed height remained substantially the same (52.9-53.3 cm); and that the bed began to compact more rapidly, once settled from the expanded state, during the period over which this effect occurred. This decline in the expanded bed height with no significant change in the static bed height can be clearly seen in the last 5 data points of the chart that constitutes Figure.

The invention provides in a further aspect of the invention, apparatus for improving the performance of a fluidised bed which apparatus comprises
  means for establishing a bed of material to be fluidised,
  injection means for injecting a stream of fluidising medium through said bed
characterised by the provision of a distributor layer of particulate material through which the fluidising medium is passed substantially prior to passing through said bed whereby turbulence in the fluidising medium as it passes through said fluidised bed is substantially reduced.

The distributor layer may be a layer of a particulate material having a density greater than that of the particles constituting the fluidised layer itself. In a particular embodiment of the present invention the distributor layer is agitated by the fluidising medium but is not itself fluidised. What is required here is that the particles constituting the distributor layer move with the flow of fluidised medium but the bed itself is not fluidised. In this way, the layer of distributor material acts to constrain the turbulence of the flow of fluidising medium, which turbulence is damped by the movement of the particles in the distributor layer. As a result, the fluidising medium serves to fluidise the bed without undue turbulence or violent movement of the particles constituting the bed. In this way, if the bed constitutes a delicate material, abrasion or damage to the particles constituting the bed is reduced to a minimum.

The distributor layer in a preferred embodiment of the invention is a moving distributor layer in which the movement of the particles of the distributor layer serves to distribute more evenly the flow of fluid medium to the underside of the fluidised bed while at the same time serving to damp out turbulence within the fluid flow. The result is a substantially lamina flow of fluid through the fluidised bed which serves to open the structure of the fluidised bed to permit interaction between the fluidising medium and the particles constituting the bed thus promoting interaction between the two while at the same time reducing to a minimum the severity of collisions between particles within the fluidised bed.

This overcomes a long-standing problem of fluidised bed technology, where hitherto the strong movement of fluidising material within the centre of the bed or in juxtaposition the fluid inlet has caused excessive agitation of the bed and the lack of uniformity of reaction conditions across it. As discussed in the introduction to this specification, a significant amount of technology in terms of nozzles, injection means, baffle plates and the like have been used in an attempt to overcome this problem.

The distributor layer may be a distinct layer below the fluidised bed and the overlap between the two layers is preferably at a minimum to reduce abrasion and/or removal of the reactant from the carrier particles, although some minimal interaction is to be encouraged as it serves to control the biofilm and allow its development in a more compact form. Typically, the fluidising medium may be a liquid.

It will be appreciated by the person skilled in the art that the thickness of the distributor layer and the fluidising medium flow rate may be selected such that substantially no turbulence is experienced in the fluidised reactant bed as a result of passage of the fluidising medium therethrough.

The precise parameters here constitute something of a balancing act. The denser the particles of the distributor layer, the greater the amount of energy necessary to produce appropriate movement within the distributor layer. Thus, there is a trade-off between density of the particles and size of particles in the distributor layer with the pressure/velocity of the fluidising medium feed. This balance is also important in gaining the benefit of biofilm control solely through interactions at the interface.

The present invention has been found to be particularly useful in fluidised bed or fermentation reactions involving biological material. In a particular aspect of the present invention the fluidised bed particles may be coated with a biofilm layer as a reactant moiety.

According to one aspect of the invention, in this particular case the particulate material constituting the fluidised bed particles may be the inert carrier medium for the biofilm. In a further aspect of the invention the inert carrier medium may be a glassy coke, upon the surface of which the biofilm layer is immobilised.

Such a material is described and claimed in our No GB99/03542 the disclosure of the specification of which is incorporated herein by reference. Cells grow best on slightly porous materials, which enables them to adhere and the biofilm to develop, whilst at the same time providing the largest possible surface area. Glassy cokes, produced by the high-temperature treatment of bituminous coals, tend to give the best results. What is required is a coke with at least a slightly glassy or vitreous surface. This results in a material that has a surface substantially impervious to the passage of mineral matter from within the coke to the biofilm layer thereon. The presence of the "glassy " surface, therefore, serves to protect the biofilm from the effects of injurious minerals and compounds frequently present in cokes. Typically, however, the coke will have a substantially uniform composition and the glassy nature of the coke will not be limited to the surface only. The glassy coke particles may have a size substantially within the range of 0.25 to 2.50 mm., in a preferred embodiment the particle size may be within the range of 1.0 to 1.7 mm.

In many processes, particularly where a biomass is involved, as, for example, in a wastewater treatment, fermentation or biocatalytic process, the reactant in the fluidised bed is a film of biomass material carried as a layer on the particles of a particulate fluidised carrier. This invention has particular application to such arrangements since an extremely valuable feature of the invention is that it allows substantially automatic control of the thickness of the reactant layer on the inert carrier medium. In a bioreactor, the layer of biological material carried by the individual particles of the fluidised bed is encouraged to grow and to reproduce. As a result, the overall density of the particles (including the biomass or biofilm layer) is reduced with a result that those particles having an increased biofilm thickness on the surface will tend to be carried upwardly through the bed towards the upper part of the reactor vessel and will eventually be carried out of the vessel itself.

We have found that by redirecting this feed from below the exit of the reactor vessel and re-introducing the particulate and biomass material at the base of the reactor vessel, the effect of the distributor layer is to strip the outer biomass material from the surface of the particles and allow the particles to resume their place in the lower portion of the fluidised bed where the residual biomass will begin, once again, in the fertile conditions within the bed, to produce a further biofilm.

In an alternative embodiment, the balance between the inlet velocity and hence momentum of silica sand can effect biofilm control substantially by interactions between the moving bed distributor material and the fluidized bioparticles.

The recycled particles may be combined with fluidising medium and prior to introduction to the distributor layer, or in an alternative embodiment, the recycled particles may be injected separately into the distributor layer.

In this latter case, it is preferred that the temperature of the liquid is controlled to within the range of 13 to 22 degrees centigrade, typically, 14-21° C.

In a further embodiment of the present invention the fluidised bed may contain an upper denitrification layer above the nitrification layer. This additional layer incorporates denitrifying bacteria to break down the nitrites and/or nitrates produced by the aerobic nitrifying bacteria in the lower nitrification layer. By allowing the nitrification to proceed almost to a stage in which the liquid, in this case water, is almost completely de-oxygenated, the conditions are ideal for anoxic conversion of the resulting nitrite/nitrates to nitrogen gas thus eliminating the nitrite/nitrates from the liquid.

The microbes involved in denitrification are normally bacteria capable of "anaerobic respiration", that is, bacteria, which respire using oxygen, but also have the ability to use chemically, combined oxygen when molecular oxygen ($O_2$) is at low concentration or absent. Sources of chemically combined oxygen that bacteria and archaea can utilise include nitrite ($NO_2^-$), nitrate ($NO_3^-$), sulphate ($SO_2^-$) and carbonate ($CO_3^{2-}$) and, by operating the nitrification reactor in such a way as to remove all the dissolved molecular oxygen, denitrifying microbes can respire the nitrite and/or nitrate. In this way, and if process control is adequate, nitrite and/or nitrate is converted to molecular nitrogen (di-nitrogen, N), which returns to the atmosphere (air=78% N). When process control is inadequate, the intermediates in the reduction of nitrate may be released into the atmosphere. Suitable denitrifying bacteria may be one or more of:

*Achromobacter piechaudii* (*Alcaligenes piechaudii*), *Achromobacter ruhlandii* (*Alcaligenes ruhlandii*), *Achromobacter xylosoxidans* subsp. *denitrificans*, *Alcaligenes denitrificans*, *Alcaligenes xylosoxidans*, *Azoarcus tolulyticus*, *Azoarcus toluvorans*, *Azospirillum brasilense* (*Spirillum lipoferum*,) *Azozoarcus toluclasticus*, *Bacillus halodenitrificans*, *Blastobacter aggregatus*, *Blastobacter capsulatus*, *Blastobacter denitrificans*, *Candidatus "Brocadia anammoxidans"*, *Comamonas denitrificans*, *Flavobacterium* sp., *Flexibacter Canadensis*, *Haloferax denitrificans* (*Halobacterium denitrificans*), *Halomonas campisalis*, *Hyphomicrobium denitrificans*, *Jonesia denitrificans*, (*Listeria denitrificans*) *Kingella denitrificans* *Neisseria denitrificans*, *Ochrobactrum anthropi*, *Paracoccus denitrificans* (*Micrococcus denitrificans*), *Pseudoalteromonas denitrificans* (*Alteromonas denitrificans*), *Pseudomonas denitrificans*, *Pseudomonas putida*, *Pseudomonas stutzeri*, *Roseobacter denitrificans*, *Roseobacter litoralis*, *Thauera aromatica*, *Thauera chlorobenzoica*, *Thiobacillus denitrificans*, *Thiomicrospira denitrificans*, *Thiosphaera pantotropha*.

This list is not, however, exhaustive.

The relatively deoxygenated water may be exhausted from the top of the fluidised bed and caused or allowed to overflow or cascade as a thin film to effect rapid aeration of the medium. Alternatively, it may be recycled through a counter-current aerator, i.e. downwards from or near the top of a narrow column; where air, oxygen-enriched air, or pure oxygen is bubbled upwards from at or near the bottom. The column diameter being sized such that the downward velocity of the liquid to be aerated or oxygenated is slightly less than the natural rise velocity of the gas bubbles, which is typically 22 centimeters per second for a 2 mm diameter air bubble rising in quiescent water and 42 cm s$^{-1}$ for a swarm of bubbles. In this way, the bubbles are retained for the longest time possible and therefore have the greatest opportunity to transfer oxygen into solution.

In a fully operating system and in accordance with the present invention another useful by-product is waste biomass material which can be packaged and sold e.g. as a fertiliser or fish-feed.

Typical apparatus in accordance with the present invention may include a generally vertical tower or reactor incorporating means for establishing a bed of material to be fluidised wherein the fluidising medium is introduced at the base of the tower to pass upwardly through the medium to be fluidised.

In one embodiment of this aspect of the invention, the fluidising medium may be injected directly to the distributor layer without first passing through a perforated or like support plate. In a preferred embodiment, the distributor layer should preferably have a density greater than that of the fluidised layer and should form a distinct layer below that of the fluidised bed.

It will be apparent to the person skilled in the art that in the absence of a support plate, the particle size of the distributor layer required for effective operation of the fluidised bed is dependent to the velocity of the fluidising medium. It is preferred that the particle size of the distributor layer should be selected such that under the prevailing conditions, the particles constituting the distributor layer move but are not themselves fluidised.

In a further aspect of the present invention the means for establishing a bed of material to be fluidised is preferably a vertical tower or reactor vessel and the fluidising medium is preferably injected at the base of the tower to pass upwardly through the medium to be fluidised.

The tower or reactor vessel may be provided with a central conduit for the supply of fluidising medium through which the supply of fluidising medium passes downwardly toward the base of the reactor or tower whereby the fluidising medium is injected downwardly against a reflector element for redirection upwardly through the distributor layer and the fluidised bed. The injection means may include a supply conduit, therefore, which is sized to have sufficient frictional losses to allow a degree of control over the flow through it by varying the hydrostatic head.

In the embodiment in which the fluidised bed carries a reactant layer on the surface of the particulate material constituting the fluidised bed itself, the thickness of the reactant layer on the carrier medium may be controlled by allowing particles containing excess of reactant on the surface to be removed from the upper part of the fluidised bed and to be recycled and injected into the bed with the fluidising medium in the manner described above. In an alternative embodiment, substantial biofilm control can be achieved simply through interactions between the moving bed distributor particles and the biofilm-coated particles.

It will be apparent from the foregoing that there will need to be control means for controlling the rate of fluid flow through the reactant bed. Such control means should include means for sampling the oxygen concentration in the fluid before or during entry into the reactor and means for sampling the oxygen concentration of the fluid or liquid on exit or after exiting the reactor. Means may be provided for adjusting the flow rate of fluid through the reactor and/or for sensing other reactor parameters such that the oxygen concentration on leaving the reactor is just above a concentration at which the oxygen concentration would be rate controlling for the nitrification process. In one embodiment of the invention, this is about 0.1 to 0.3 mg/l. The apparatus in accordance with the present invention may also include means for aerating the liquid exiting from the reactor vessel. In this connection, the aeration may be effected by cascading the liquid over the top of the reactor and allow it to fall through air for collection. In an alternative embodiment, aeration may be effected by recycling fluid from the end of the fluidized bed distal to the distributor to the upper end of an aeration column, where oxygen-containing gas bubbles are injected at or near the lower end and rise, counter-current, to the descending liquid; thereby transferring oxygen with increased efficiency. A typical aeration efficiency in a prior art co-current process is in the order of 3-6%; whereas in the present invention, efficiencies of the order of 7-12% in the counter-current process of the present invention.

Means may be the provided to separate sloughed biomass from the reactor; such means may be a sedimentation tank or hydrocyclone. Another means of controlling the fluid flow through the system may be effected by providing header tank means, pump means for pumping fluidising medium to the head tank and supply means from said header tank to the injection means for the fluidised bed, the arrangement being such that the header tank provide sufficient hydrostatic pressure at the injection means to maintain the distributor layer and to effect fluidisation of the bed. It follows from this, therefore, that control of the flow rate through the apparatus in accordance with the invention may be effected by controlling the hydrostatic head in the header tank. In a particular aspect, the injection means may include a supply conduit therefore, which is sized to have sufficient frictional losses to allow a degree of control over the flow simply by varying the applied hydrostatic head to the fluid entering the conduit.

Where the method and apparatus of the present invention is used in the purification of water, it is frequently the case that wastewater is discharged to a waste tank in which further purification takes place by virtue of membrane filtration. Such a process is relatively slow and quite expensive to operate. From time to time the membrane "blinds" as a result of being clogged by suspended matter. We have found surprisingly that the proportion of suspended matter and biological residues, including suspended, viable bacteria in water purified in accordance with the present invention is reduced quite significantly with a result that membrane filtration treatment subsequent to the nitrification treatment in accordance with this invention can proceed much more efficiently. The average reduction in suspended solids concentration using the British Standard method (BS EN 872: 1996 BS 6068: Section 2.54: 1996) was 2.4 mg/l, which equated to 21 percent; and the average reduction in numbers of viable Escherichia coli was nearly 80 percent.

BRIEF DESCRIPTION OF THE SEVERAL VIEWS OF THE DRAWINGS

Following is a description by way of example only and with reference to the accompanying informal drawings of methods of carrying the invention into effect.

In the drawings.

DETAILED DESCRIPTION OF THE INVENTION

Despite many years experience of using glassy coke as a biomass support material in laboratory-scale fluidised bed bioreactors, severe turbulence was noted in the lower region of a pilot scale nitrification plant. The particular plant was established which had flow distribution via downward discharge into a 60° cone, a common design for this scale of operation. Although the scientific literature describes a turbulent region above some types of distributor before the flow is calmed and smooth fluidisation is established, it was thought that this was a problem peculiar to dense materials such as sand, where higher flow velocities are required to achieve fluidisation. A similar observation was to some extent made with glassy coke, because the turbulent region only extended 30-40 cm up the fluidised bed compared to a 60-100 cm spouted bed region reported for a sand fluidised bed in a similar pilot scale reactor having a porous plate fitted above the inlet cone see P. F. Cooper, and D. H. V. Wheeldon, "Complete treatment of sewage in a two-fluidised bed system", Chapter 7 in P. F. Cooper and B. Atkinson (Editors), "Biological Fluidised Bed Treatment of Water and Wastewater", Ellis Horwood, Chichester, 1981.

Figure 1:
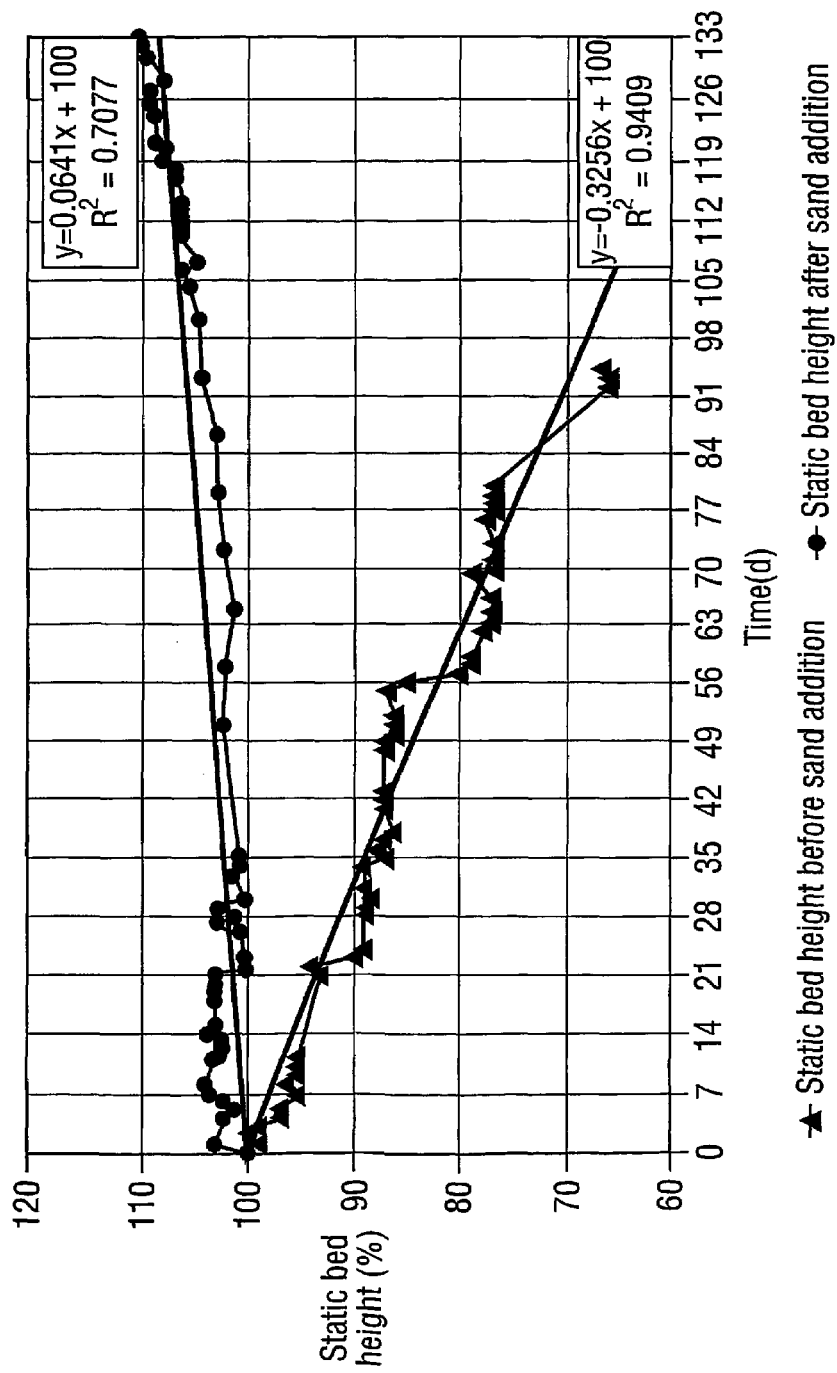
FIG. 1 is a graph showing the change in static bed height before and after the addition of a moving, silica sand bed to assist flow distribution.

Continued operation of the pilot reactor with coke was characterised by the production of fines by severe attrition. This led to the recirculating water becoming black and opaque overnight, requiring regular flushing of the reactor to restore clarity, even though the flow rate through the system was equivalent to the entire volume being replaced approximately every two hours. Operation was continued, as it was expected that the eventual formation of a biofilm on the coke particles would protect it from further abrasion, because this had occurred with the laboratory-scale bioreactors. Unfortunately, such protective colonisation did not occur. Regular measurements demonstrated that approximately 0.3% of the original static bed height was lost per day (FIG. 1), meaning that all the coke would wear away in about 10 months. Obviously, the rate of attrition exceeded the rate of colonisation. Previously, upward discharge into an expansion zone had been used for laboratory scale bioreactors, with little evidence of coke attrition. The high rate of attrition at pilot-scale was all the more surprising since it had previously been found that glassy coke was much more durable than activated carbon.

In an experiment to try and reduce the turbulence-generating effect of the inlet flow on the expanded coke bed, a laboratory-scale rig was used. This rig was fed by upward discharge of tap water via an expansion section into a bed of glassy coke. At high flow rate, this mimicked the turbulence generating effect seen with the pilot reactor. Increasing quantities of silica sand were added until there was sufficient (8.5 cm depth) to absorb the force of the inlet flow and distribute it in a sufficiently even manner to produce a smoothly fluidised bed of coke, with no sign of turbulence or spouting.

In the pilot scale operation, silica sand was added incrementally to the bioreactor until the turbulence-calming effect was noted. This required a sand bed 10 cm deep. Once smooth fluidisation of the coke had been achieved, the reactor was flushed to remove the accumulated fines and to restore optical clarity. Even after overnight operation, the recirculating water was still clear: the generation of fines had ceased. In fact, the water remained clear from the time that sand was added as a moving bed flow-distributor: fines generation by attrition of the coke had indeed stopped. This fact is clear from the static bed height data presented in FIG.

1. Furthermore, colonisation of the coke by nitrifying bacteria now began, and proceeded at a rate equivalent to almost 0.1% of the new static bed height per day. The bed now grew in size, compared to the steady decrease prior to the addition of sand.

Figure 2:
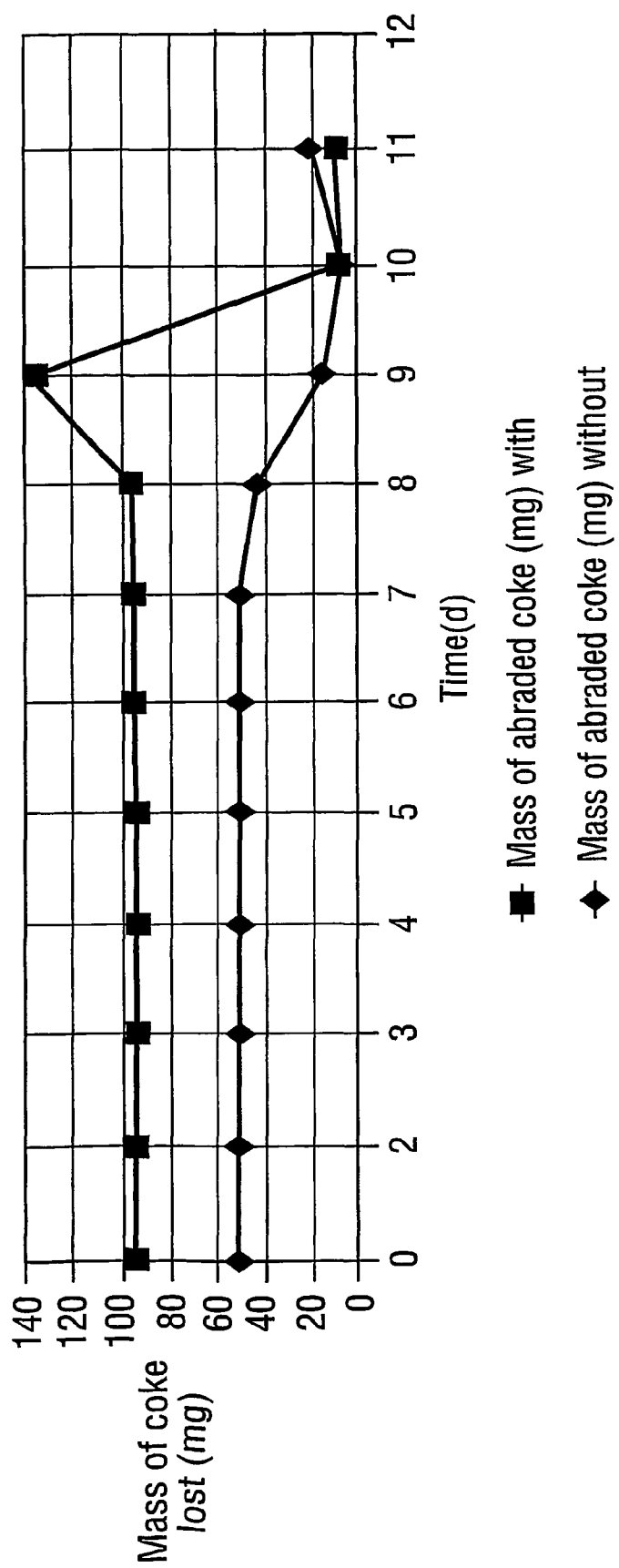
FIG. 2 is a graph showing the rate of abrasion of a fluidized bed of glassy coke, with and without a moving, silica sand distributor.

The unexpected effect of adding a layer of silica sand to the base of a glassy coke fluidised bed led to an experiment to compare the degree of coke abrasion with and without sand. Two 5 cm diameter columns 50 cm tall were assembled and charged either with a 15 cm depth of glassy coke or a 5 cm depth of silica sand and a 15 cm depth of glassy coke. The beds were fed from a header tank at an upward velocity of 1.5-2.0 cm s$^{-1}$ and allowed to overflow into a sedimentation tank. Fine particles of coke settled in the tank, were collected by filtration on a daily basis and dried to constant weight. Although fines were still abraded from the coke bed with the moving sand bed distributor, it was at approximately half the rate when no sand was present (see FIG. 2). This is surprising, given that the denser sand particles might be expected to collide more forcefully with the coke than would coke particles on their own. However, because of the greater density of silica sand, it cannot expand and become fluidised at the upward velocities used with glassy coke particles of a size suitable for colonisation by microorganisms. Indeed, it was surprising to find that the mass of sand per unit area needs to be such that it exerts a greater "pressure" than the calculated pressure drop across the sand bed required to achieve expansion prior to fluidisation. The sand layer is in a minimally expanded state i.e. not fluidised and this allows the sand bed to distribute the flow but not become mixed with the coke. In this way, the rate of coke attrition becomes less than the rate of microbial colonisation, and biofilm formation can begin.

From this experimental evidence, it is apparent that the fluidised layer should be significantly less dense than the moving bed distributor material, relying as it does on the expansion and fluidisation of the less dense upper layer but not the distributor material. Because silica sand is a commonly used biomass support material for fluidised bed reactors, a more dense material, such as garnet or ilmenite, must be used in combination as a moving bed distributor for such a support. However, this combination would require more energy for bed expansion and fluidisation than does the use of glassy coke and silica sand. Alternatively, the use of a moving bed of e.g. silica sand as the flow distributor will allow the use of biomass or biocatalyst support materials such as activated carbon, which otherwise wears away too easily.

Conventionally, wastewater or other aqueous liquid is pumped into the distributor zone of a fluidised bed in order to induce bed expansion. In wastewater treatment, this accounts for approximately 40% of the energy required to operate the process. On sloping sites, a gravity-fed system is possible, which would considerably reduce the energy cost. Even without a sloping site, using large, efficient pumps to raise the wastewater to header tanks, and thereby provide a hydrostatic head for expansion of many beds at a time, would be more energy efficient than delivery by individual pumps. This would save the operators, and hence the public, money; as well as reduce the environmental damage caused by excessive energy generation. Moreover, by judicious design it is possible to regulate automatically bed expansion, without human or machine intervention, to take account of variations in flow.

A gravity-fed "fluidised bed" is described by R. Badot, T. Coulom, N. de Longeaux, M. Badard and J. Sibony ("A fluidised-bed reactor: the Biolift process", Water Science and Technology Vol. 29 10-11 : 329-338, 1994), but the system as described here is not a true fluidised bed. Rather, it is a circulating bed reactor. Furthermore, it is a three-phase system (gas-liquid-solid) rather than a two phase one (liquid-solid). Moreover, it is designed with an upward flow inlet via a cone-shaped expansion zone at the base.

Figure 10:
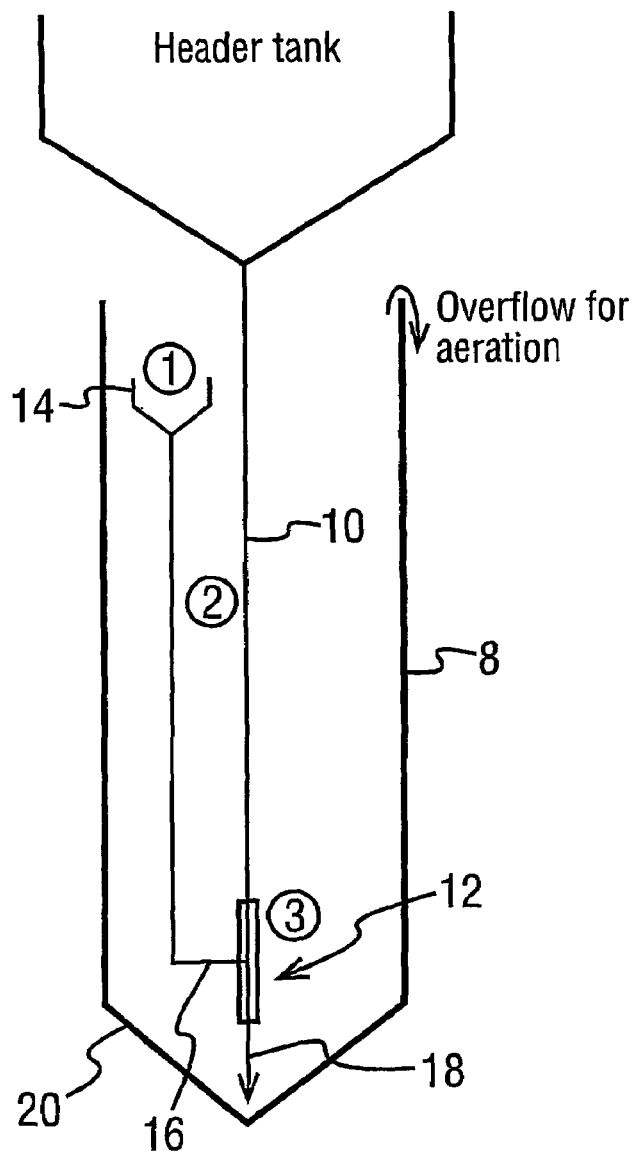
FIG. 10 is a diagrammatic representation illustrating the technique of biomass thickness control in accordance with the present invention.

An interesting feature of the present invention involves using a pipe (10) extending downwardly through the bed (12) from an integral or independently supported overhead tank (FIG. 10). This pipe being sized so as to have sufficient frictional losses to allow a degree of control over flow through it by varying the hydrostatic head, from virtually zero to tens of centimeters, with excess flow into the header tank being returned via an overflow device (14). This automatic control system is to allow for a substantial variation in bed expansion, which in turn is to accommodate a substantial change in effluent flow-rate. Such change being caused, for example, by diurnal or wet-to-dry weather fluctuations in effluent flow rate. It will be appreciated that in the treatment of waste water, in dry conditions the water will have a much higher concentration of nitrogen than when it is highly diluted with storm water.

Pumping costs for water are a significant expense for any wastewater treatment system. In this aspect of the invention, bed expansion is induced by a commonly fed, gravity flow system. Because the density of glassy coke is low, compared to more conventional biomass support materials like silica sand, only a relatively small hydrostatic head is required for expansion. For laboratory-scale systems, a 5-30 cm hydrostatic head was adequate to produce sufficient flow for good bed expansion. Scale-up (to e.g. 50-200 cm diameter, 1-5 m tall columns) does not entail a significant scale-up of the hydrostatic head, other than to take into account any additional frictional losses.

Figure 3:
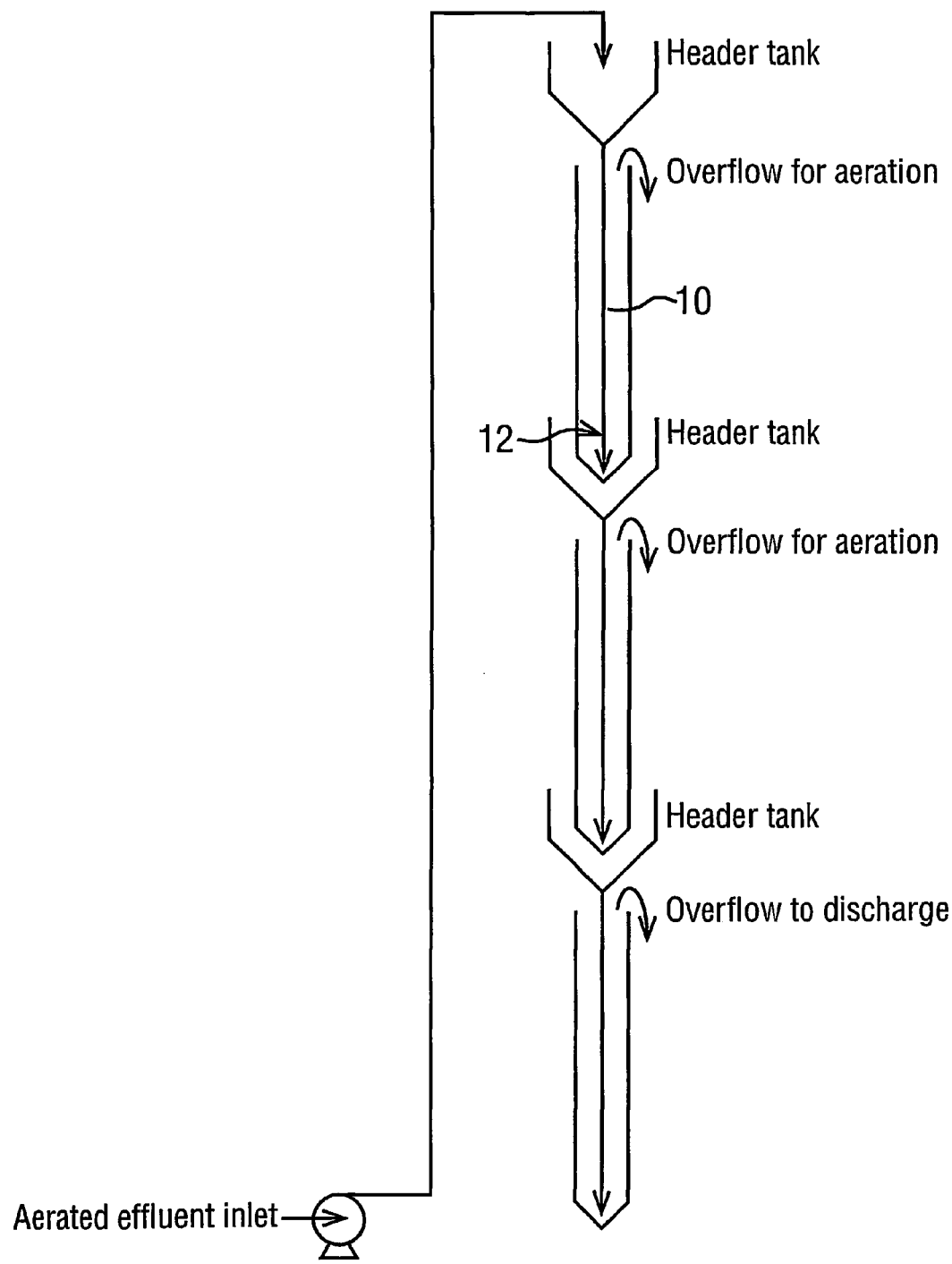
FIGS. 3 to 9 illustrate various embodiments of the use of a fixed hydrostatic head for the apparatus in accordance with the present invention.
Figure 4:
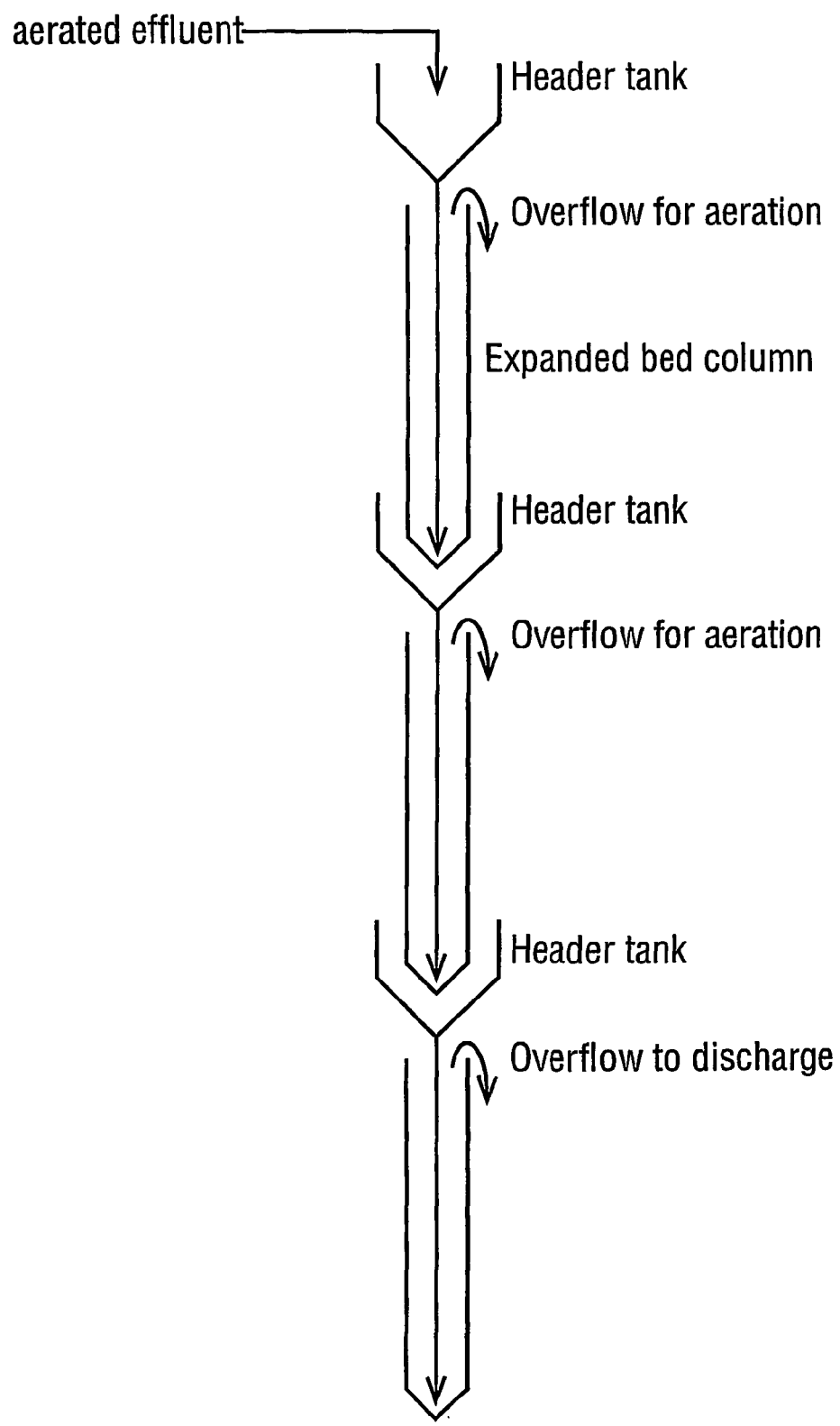
Figure 5:
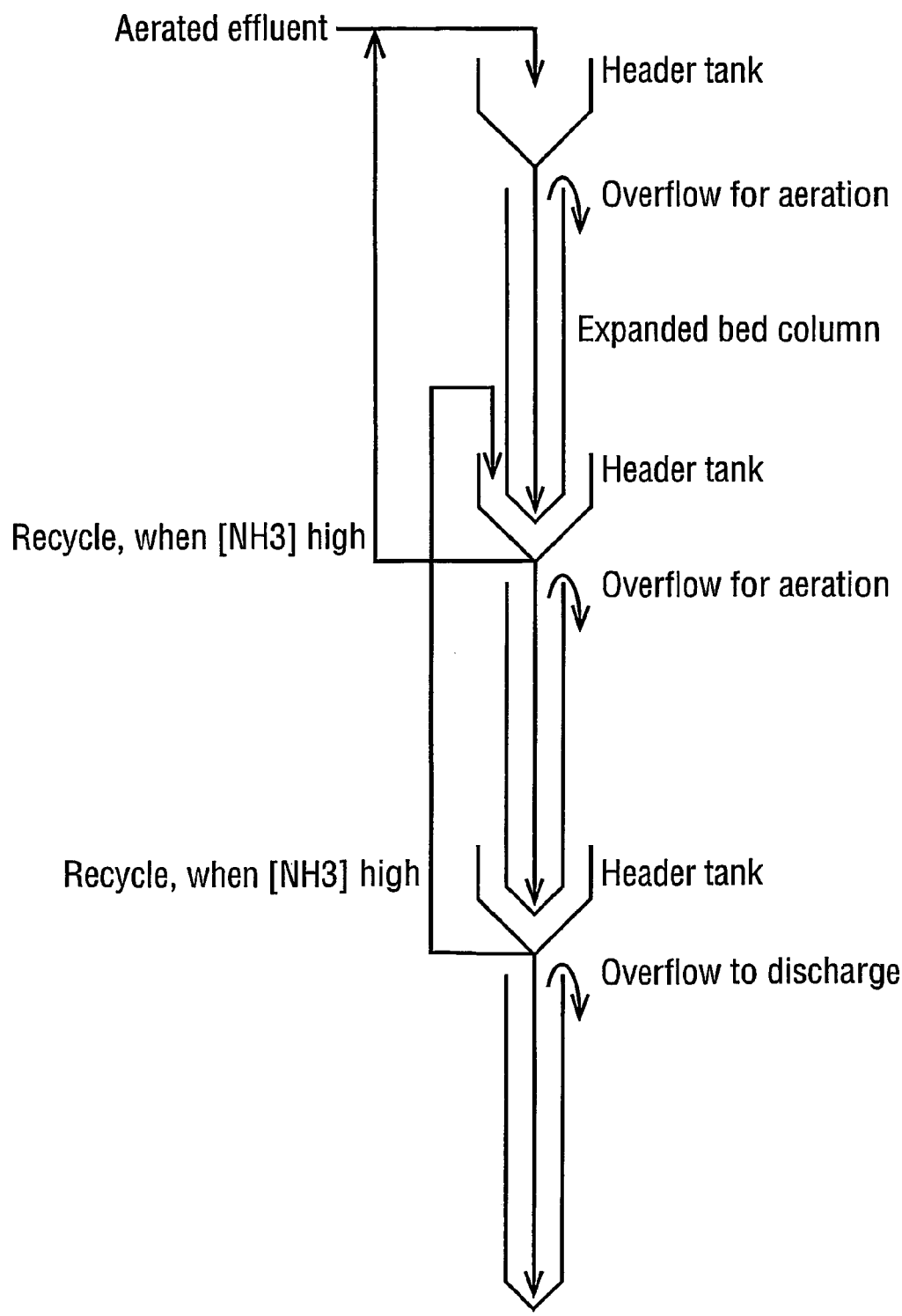
Figure 6:
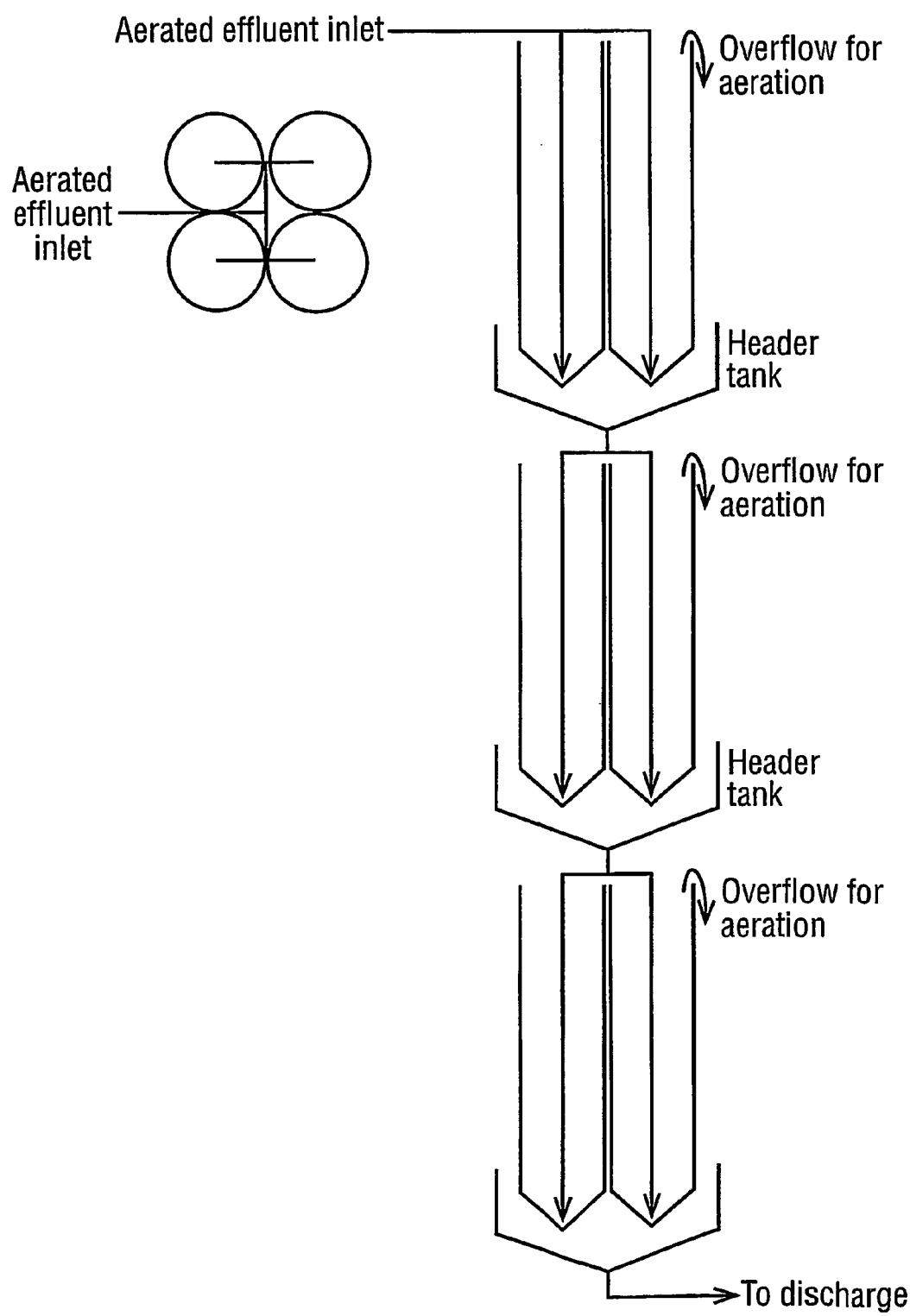
Figure 7:
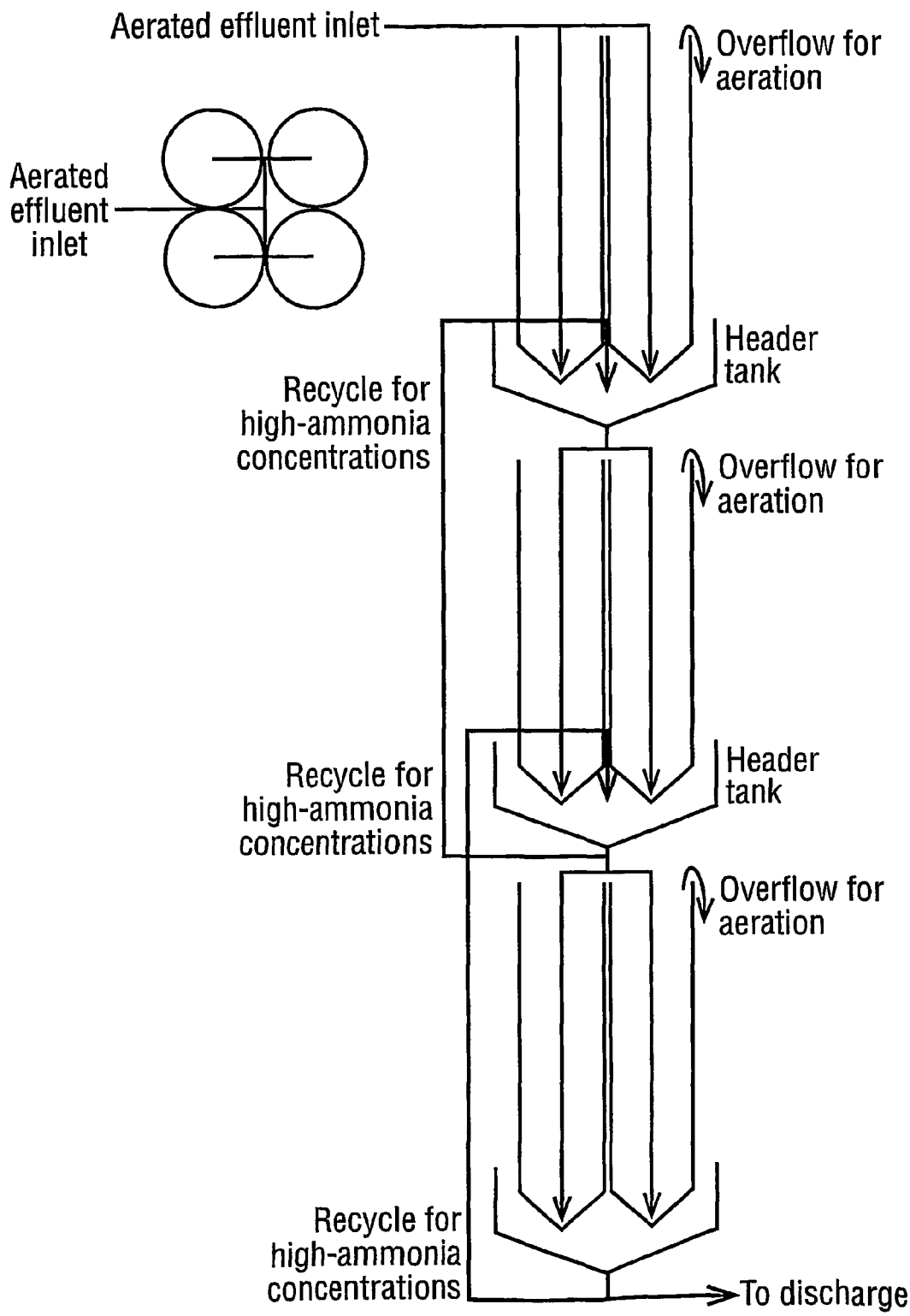

Calculations from laboratory-scale operation, based on the use of either artificial feed or activated sludge effluent, demonstrate that almost complete nitrification can be achieved either by sequential passage through a series of beds, where the number of beds is equal to the inlet ammonia concentration minus the required discharge concentration ÷2 or by recycling several times with a cascade of only several beds where the number of recycles and beds is calculated in a similar manner. These calculations are based on an unpressurised system where oxygen is supplied from air. With pressurized systems or systems where oxygen enrichment is used, the number of beds or recycles can be reduced pro-rata to the increase in dissolved oxygen concentration thereby achieved. During high flow conditions typical of wet weather, when the ammonia is more dilute (e.g. 6 mg $NH_3$—N dm$^{-3}$), a single pass through each of only two or three columns will be sufficient (see FIG. 3). Counterintuitively, it is calculated that pumped flow for recycle will only be required for lower, dry weather flows, because then the ammonia is more concentrated (up to 25 mg NH3-N dm -3) Thus, our novel design only requires pumping of the minimal volume of wastewater. Even for dry weather flows, only a single recycle will be required, thereby minimising the energy requirements. Thus, pump size, cost, and energy consumption will be minimised.

Figure 8:
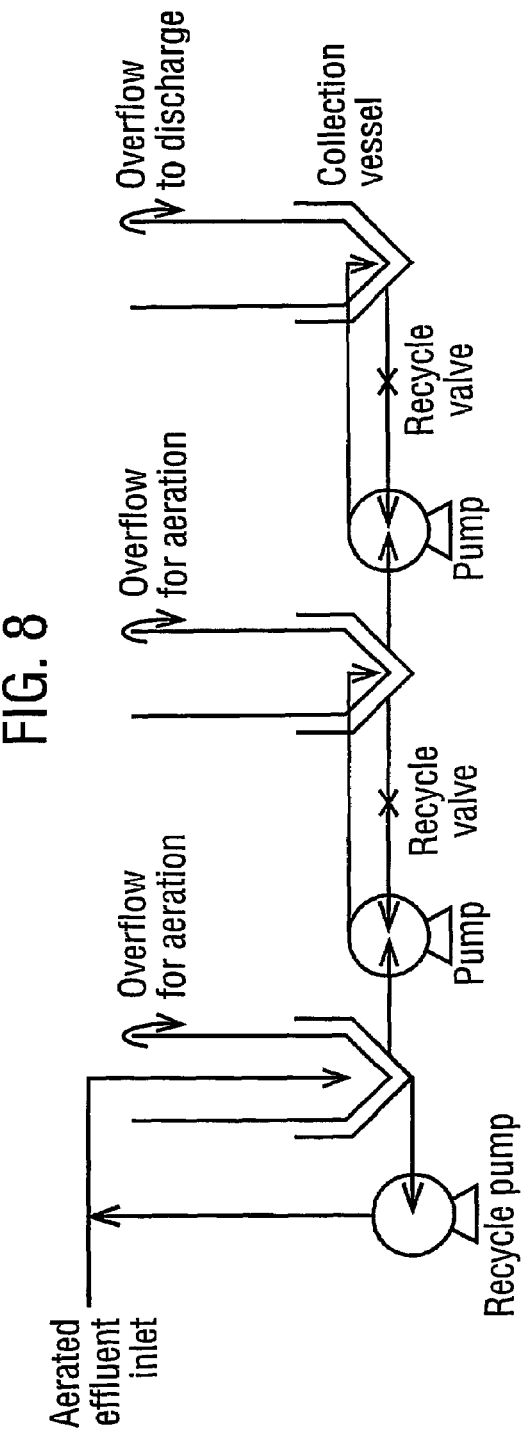
Figure 9:
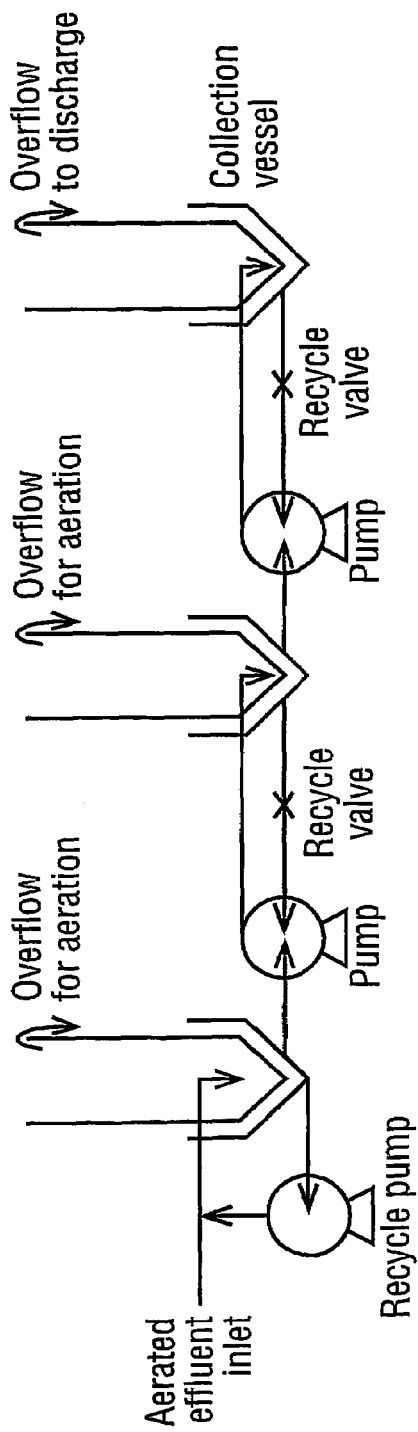

At other than sloping sites, the wastewater will need to be pumped to a height above the top of the highest bed to produce sufficient hydrostatic head for bed expansion. From there it will flow by gravity, except for recycle flow under conditions of dry weather or high ammonia concentration. By judicious design, common pumping stations and header tanks will minimise construction and operating costs. However, this design efficiency is dependent on having a manifold made to produce equal flow at each fluidised bed module. FIGS. 3-7 illustrate various configurations of fluidised bed modules in cascade arrangements. Obviously, there is no need to place one module above another if effluent is pumped to each module, e.g. at sites where sufficient land area is available and pumping costs are not prohibitive (FIGS. 8 and 9).

In the activated sludge process for secondary (biological) treatment of sewage, the supply of compressed air accounts for up to 60% of energy cost. Where the oxygen demand of the biological process is high, oxygen-enrichment of the supplied. air is required, which is even more expensive.

In conventional biological fluidised bed processes for wastewater treatment, such as nitrification, oxygen is supplied to the microorganisms either by bubbling air through the bed, see for example U.S. Pat. No. 4,490,258 or by supplying pre-aerated effluent to the bed, see UK Patent No 1520895. The first solution suffers from excessive biomass stripping from the support particles; whilst the latter solution is expensive. Air is expensive to compress and, when supplemented with oxygen, aeration is even more expensive. In some systems, the air is entirely replaced with oxygen, occasioning expensive and hazardous storage facilities.

Expense notwithstanding, systems to supply dissolved oxygen are designed to be operated under pressure, necessitating expensive pressure vessels of difficult to fabricate shape. Operation under pressure increases the oxygen carrying capacity of the wastewater, according to Henry's Law. However, increased dissolved oxygen concentration can lead to at least two problems when discharged to the fluidised bed. First, the lower pressure in the bed causes de-gassing, with the resultant bubbles causing biofilm to be stripped from the support material particles. Second, the higher dissolved oxygen content causes oxidative stress to the bacteria, leading to the diversion of energy and materials from the desired biological process and into repair and protection of the cells. Third, the release of gas bubbles into a fluidised bed tends to convert it into a re-circulating bed, resulting in the establishment of rapid vertical mixing, thereby disrupting the formation of physical, chemical and biological gradients.

Another consequence of an air circulating bed is to cause the oxygen concentration to be equilibrated throughout the volume of the liquid in the vessel. Although most aerobic biological processes require only low levels of dissolved oxygen, they tend to be controlled at a minimum concentration of 2 mg $dm^{-3}$, which approximates to 20-30% saturation with respect to air. Not only does this decrease the driving force for oxygen transfer but it also means that zones of different oxygen concentration cannot be achieved. In natural biological systems, gradients of nutrient concentration, including oxygen, are important for establishing different populations of microbes, each suited to different biological processes. The relationship between the dissolved oxygen concentration at the top of the bed and the residual ammonia concentration in the treated effluent indicates that a dissolved oxygen concentration greater than 0.3 mg/l is required to achieve a residual ammonia concentration less than 1 mg/l.

Operation of a fluidised bed of glassy coke colonised by a nitrifying biofilm can lead to complete depletion of the dissolved oxygen as the wastewater passes up through the bed, giving high rates of nitrification, despite industry guidelines for maintaining dissolved oxygen at a minimum concentration of 2 mg $dm^{-3}$. Operation without gas bubbling in this way allows the dissolved oxygen concentration to fall low enough to allow de-nitrifying bacteria to use the nitrite and/or nitrate produced by the aerobic nitrifyers lower down.

It is, therefore, possible to have a denitrification zone above the nitrification one, all in the same bioreactor. This significantly improves the space utilisation and operating cost efficiency of the system. Furthermore, on exit from the bed, the virtually oxygen-free wastewater rapidly absorbs oxygen from air or other oxygen-containing gas, flowing or bubbling counter-current to the wastewater recycle flow, causing the dissolved oxygen to be raised to a concentration in excess of 85% in a matter of seconds. Moreover, the efficiency of this counter-current oxygen transfer is more than double that of the more conventional co-current aeration (7-12% oxygen removed compared to 3-6%).

It is well known that the driving force for oxygenation is proportional to the difference in partial pressure between the gas phase (air, 100%) and the liquid phase (water, initially at or near 0%). Furthermore, allowing oxygen-depleted water to cascade for a distance of as little as 100 cm down the outside of a column also causes rapid re-aeration, reaching a value of 45-80% at the bottom.

Allowing the wastewater to overflow the top of the expanded bed column and run down its sides creates a thin film, which helps to maximise the rate of oxygen transfer. To achieve fluidisation of small glassy coke particles, the wastewater rises up the bed at between 0.5 to 2.0 cm/sec, thereby taking between 50-200 seconds to rise 1.0 m. In contrast, a sheet of water in contact with a vertical surface falls at almost 1.5 m/sec (Grassmann, P. Physical Principles of Chemical Engineering, Pergamon Press, 1971). Thus, a film of between 40-160 µm can be expected to form around a 10 cm diameter column, and one of 400-1600 µm for a 50 cm diameter one. The high slip velocity between the gas and liquid phases minimises the thickness of the laminar boundary layer, thereby maximising the rate of oxygen transfer. It has been established for a 10 cm diameter column that a high degree of oxygenation (45-80% dissolved oxygen concentration) can be achieved with a fall of just 1.0 m. Similar results are expected for a 50 cm column; especially if the fall, degree of turbulence or surface area of water film is increased, thereby causing an increase in the oxygenation rate.

It follows therefore that by building fluidised bed modules with a header tank, for feeding wastewater and causing bed expansion, re-aeration of the wastewater can be optimised by allowing it to flow down the outside of a reactor vessel (FIGS. 4-8). In this way, the major energy costs of supplying oxygen are largely dispensed with.

Whilst the encouragement of microbial growth as attached biofilm on small particles of biomass support material for operation as a fluidised bed gives clear process advantages, it does create the problem of biofilm overgrowth. Investigations of the kinetics of biochemical conversions in microbial biofilm indicate that as the film thickness increases, cells further than about 0.1 to 0.15 mm (100-150 µm) from the outer surface become starved, particularly of oxygen (M. Denac, S. Uzman, H. Tanaka & I. J. Dunn, "Modelling and experiments on biofilm penetration effects in a fluidised bed nitrification reactor", Biotechnology and Bioengineering Vol. 25: 1841-1861). Control of biofilm thickness can, therefore, have significant advantages in terms of process efficiency, by ensuring that the majority of cells in the biofilm are supplied with sufficient nutrients or oxygen.

Jeris, Beer and Mueller of Ecolotrol in U.S. Pat. No. 3,956,129 describe several methods for biofilm control by removal and mechanical agitation. These methods included a mixer with "a rotating blade similar to a Waring Blender", or the "use of compressed air or water sprays". In later inventions, Jeris discloses "a rotating flexible stirrer" at the top of the bed U.S. Pat. No. 4,009,098, a mechanical stirrer mounted in the top of the bed U.S. Pat. No. 4,009,105 and U.S. Pat. No. 4,009,099) or "rotating a sharp blade or flexible agitator" at the top of the bed GB1520895 or "rotating a sharp blade or flexible stirrer" at the top of the bed U.S. Pat. No. 4,009,099. Later work at Ecolotrol, by Hickey and Owens, disclosed a control system based on a separator column within the upper portion of the fluidised bed, which relied on a variety of agitator arrangements for biofilm stripping see EP Patent 0007783. These agitator arrangements included a motor-driven blade, a transducer to produce sonic energy, a pump for removal of particles with thick biofilm and return of particles stripped of biofilm, and a similar pumped system but with a static line mixer or a means to effect hydraulic shearing. One of the more novel approaches to biofilm control has been described in U.S. Pat. No. 4,618,418, where support particles coated with thick biofilm are carried by gas lift to a rim where they overflow into a settling zone. These particles are then carried down to a point " . . . preferably somewhat below halfway the distance between the roof of the reaction space and the liquid distribution device . . . ", for re-entry into the fluidised bed.

In all the above cases of biofilm removal devices and methods, significant energy and mechanical equipment are required to achieve control, the latter also requiring periodic maintenance and replacement. Moreover, the stripped biofilm must be wasted from the system and de-watered prior to disposal, with the stripped biomass support material particles recovered for return to the bed.

In the present invention biofilm control can be performed with minimal energy cost and in a system with no moving parts. In this way, costs for installation, operation, maintenance, and replacement are minimised. Normally, the bed will expand through biofilm growth, with the particles carrying thicker biofilm tending to migrate towards the top of the bed due to their decrease in density. If an overflow device (14) is incorporated at a point in the bioreactor (8) where bed height is to be controlled, then further growth of the biofilm will cause the most thickly-coated particles to enter the overflow device (14) (FIG. 10). These particles are caused to flow, under the combined influence of gravity and flow induced by a venturi injector (16) positioned just before the end of the down flowing inlet stream (18) (FIG. 10). The fluidising medium then impacts on the lower wall (20) of the reactor vessel and reverses its flow upwardly and through the distributor layer and the fluidised bed (12).

Figure 11:
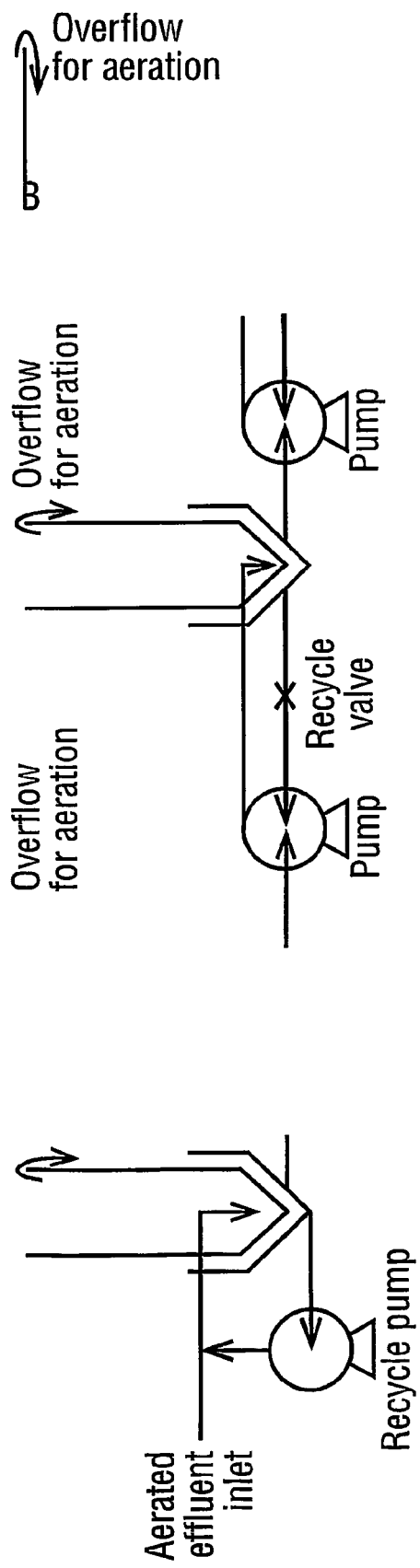
FIG. 11 is a diagrammatic representation of an alternative pumped version of the embodiment shown in FIG. 10.

Alternatively, with pumped systems, the overflow device and venturi can be external, but again positioned just before the inlet to the bed (FIG. 11). In this way, particles with thick biofilm re-enter the bed in the most turbulent region, that of the distributor. Furthermore, if that region contains a bed of small, dense, mobile particles (e.g. silica sand) below a less dense bed of biomass support material (e.g. glassy coke) then even more efficient biofilm stripping can occur as the biofilm-coated coke passes through the lower, moving bed and the lower region of the upper, fluidised bed.

A number of comparative experiments were conducted to test the effectiveness of the distributor layer in assisting in biofilm stripping. Plots were made one for the expanded bed and moving bed distributor in accordance with the present invention and the other without the distributor material.

Further advantages of this approach include the automatic return of biomass support material to the bed. Although these particles will have been stripped of their thick biofilm, they will still retain a sufficient number and mixture of bacteria to allow the rapid re-development of fresh biofilm. In this way, moribund cells are removed and replaced by fresh ones. Not only that, but the stripped cells are retained in the system, where active ones can help re-colonise stripped particles and also contribute to the overall performance of the system before eventually being washed out. Biomass leaving the system will either be as biofilm particles or caused to aggregate into biofilm flocs because of the hydrodynamic conditions during passage through the bed. This aggregated microbial matter is significantly more easily separated from the wastewater, either by sedimentation, centrifugation, filtration, or other well-known techniques. In particular, allowing the treated wastewater to exit the system via a hydrocyclone will concentrate the biomass in the most energy efficient manner.

In an alternative embodiment, recycle of thicker biofilm-coated particles from the top of the bed via an injector is not required. With the correct balance between inlet fluid velocity and moving bed distributor particle momentum, there is sufficient interaction with the overlying fluidized bed of bioparticles to substantially effect biofilm control.

The invention claimed:

1. A method of treating a liquid by passing said liquid through a fluidised bed of particulate material in which a biofilm as a reactant moiety is carried on carrier particles constituting the fluidised bed within a bioreactor having a base, fluidising the bed by the upwards passage of said liquid therethrough, removing carrier particles having an excess of biofilm on their surface from an upper part of the fluidised bed, and recycling and injecting the same into the bed at said base of the bioreactor, wherein excess biofilm is removed from said carrier particles injected into the bed by action of said injecting of said particles into the bed, without any extraneous mechanical agitation means.

2. A method as claimed in claim 1, comprising passing the liquid through a distributor layer prior to passage through the fluidised bed, and wherein the step of recycling and injecting said carrier particles having an excess of biofilm on their surface into the bed comprises injecting said carrier particles via an injector to the distributor layer, whereby excess biomaterial is stripped from the carrier particles.

3. A method as claimed in claim 1, wherein the particulate material of the fluidised bed is a glassy coke, and the reactant moiety comprises a biomass that is immobilized as a biofilm grown on the surface of the glassy coke particles.

4. A method as claimed in claim 3, wherein the glassy coke particles have a "glassy" or slightly glazed surface and a size within the range of 0.25 to 2.50 mm.

5. A method as claimed in claim 4, wherein the glassy coke has a particle size of 0.7 to 1.0 mm.

6. A method as claimed in claim 1, wherein the liquid is a medium to be nitrified and the biofilm comprises a nitrifying bacteria.

7. A method as claimed in claim 6, wherein the temperature of the liquid is controlled to within the range of 13 to 22 degrees centigrade.

8. A method as claimed in claim 6, wherein the fluidised bed contains an upper denitrification zone above a nitrification zone, which nitrification zone comprises aerobic nitrifying bacteria, said upper zone incorporating a denitrifying bacteria to break down the nitrite and/or nitrate produced by nitrifying bacteria in the nitrification zone.

9. A method as claimed in claim 1, wherein the liquid is exhausted from a top of the bed, and causing or allowing the liquid to overflow or cascade as a thin film through air to effect aeration of the liquid.

10. A method as claimed in claim 1, wherein said liquid is subjected to further purification by membrane filtration, after passage through the fluidised bed.

11. A method as claimed in claim 1, further comprising exhausting the liquid from a top of the bed, and recycling it through a counter-current aerator.

12. A method as claimed in claim 11, further comprising bubbling air, oxygen-enriched air or pure oxygen upwards through a column of said counter-current aerator, and passing said liquid downwardly through said column, which column is sized such that the downward velocity of said liquid is slightly less than the natural rise velocity of the gas bubbles, whereby the gas bubbles are retained for the longest time for transferring oxygen into solution.

13. A method as claimed in claim 2, wherein carrier particles having an excess of biofilm on their surface are caused to flow, under a combined influence of gravity and flow induced by the injector, so as to impact a lower wall of the bioreactor and reverse flow upwardly through the distributor layer and the fluidised bed, said impact on the lower wall and reversal through the distributor layer causing excess biota to be removed from said carrier particles.

14. Apparatus for treating a liquid comprising:
a bioreactor containing a fluidised bed of particulate material, said bioreactor having a base, and said fluidised bed being constituted by carrier particles carrying a biofilm as a reactant moiety and having an upper part; and
an injection device for injecting a stream of liquid to be treated to the bed such that the liquid passes upwardly through said bed, thereby fluidising said bed;
said apparatus being configured for removing carrier particles having an excess of biofilm on their surface from said upper part of the fluidised bed, and recycling and injecting them to the bed at or towards said base of the bioreactor, wherein the injection device is structured and arranged such that excess biofilm is removed from said carrier particles injected into the bed by action of said injecting of said particles into the bed, without any extraneous mechanical agitation means.

15. Apparatus as claimed in claim 14, wherein said apparatus comprises an overflow device at a position in said bioreactor where the height of the fluidised bed is to be controlled, whereby said carrier particles having an excess of biofilm on their surface overflow into said overflow device and are injected to the bed at or towards the base of the bioreactor.

16. Apparatus as claimed in claim 15, wherein said overflow device communicates with the injector device for injecting the carrier particles having an excess of biofilm on their surface to the fluidised bed.

17. Apparatus as claimed in claim 15, wherein said carrier particles having an excess of biofilm on their surface to the fluidised bed are pumped from the overflow device back into the bioreactor.

18. Apparatus as claimed in claim 14, wherein said injection device comprises an inlet to the bioreactor for said liquid to be treated, and said apparatus is configured to supply said recycled carrier particles having an excess of biofilm on their surface to said liquid just upstream of the inlet to the bed.

19. Apparatus as claimed in claim 14, wherein the bioreactor is provided with a central conduit for supplying said liquid downwardly to the base thereof, and a reflector element at said base, the injector device being arranged to inject said carrier particles having an excess of biofilm into said liquid flowing downwardly to the base, whereby the liquid is injected against said reflector element for redirection upwardly through the fluidised bed.

20. Apparatus as claimed in claim 14, wherein said fluidised bed comprises inert carrier particles carrying a layer of a biomass comprising nitrifying bacteria, said inert carrier particles including a substantial proportion of coke particles having a "glassy" or slightly glazed surface, and a size within the range 0.25 to 2.50 mm, and carrying a biofilm of said nitrifying bacteria on the surface thereof.

21. Apparatus as claimed in claim 20, further comprising, a control device, which control device includes a device for sampling the oxygen concentration in the liquid before or during entry into the fluidised bed, a device for sampling the oxygen concentration of the liquid at or after the exit of the fluidised bed, and a device for adjusting the flow rate of liquid through the fluidised bed, and/or other parameters, such that the oxygen concentration on leaving the fluidised bed is just above a concentration at which the oxygen concentration would be rate controlling for the nitrification process.

22. Apparatus as claimed in claim 14, wherein said apparatus is configured for aerating liquid exhausted from a top of the fluidised bed.

23. Apparatus as claimed in claim 22, wherein said apparatus comprises a counter-current aerator.

24. Apparatus as claimed in claim 23, wherein said counter-current aerator comprises a column, a device for directing said exhausted liquid downwards through said column, and a device for bubbling air, oxygen-enriched air or pure oxygen upwards through the column, wherein the column is sized such that the downward velocity of said liquid is slightly less than the natural rise velocity of the gas bubbles, whereby the gas bubbles are retained for the longest time for transferring oxygen into solution.

25. Apparatus as claimed in claim 22, wherein said apparatus is configured for causing or allowing liquid exhausted from a tap of the fluidised bed to overflow or cascade as a thin film to effect rapid aeration thereof.

26. Apparatus as claimed in claim 14, further including a device to separate sloughed biomass from the fluidised bed.

27. Apparatus as claimed in claim 14, further including a header tank, a pump for pumping said liquid to said header tank, and a supply device from said header tank to the injection device, whereby the header tank provides sufficient hydrostatic pressure at the injection device to effect fluidisation of the bed.

28. Apparatus as claimed in claim 27, wherein the injection device includes a supply conduit therefor, which is sized to have sufficient frictional losses to allow a degree of control over the flow through it by varying the hydrostatic head.

29. Apparatus as claimed in claim 14, further comprising a membrane filtration device for further purifying the liquid after passage through the fluidised bed.

* * * * *

UNITED STATES PATENT AND TRADEMARK OFFICE
CERTIFICATE OF CORRECTION

| | | |
|---|---|---|
| PATENT NO. | : 7,309,433 B2 | Page 1 of 1 |
| APPLICATION NO. | : 10/492495 | |
| DATED | : December 18, 2007 | |
| INVENTOR(S) | : Dempsey | |

It is certified that error appears in the above-identified patent and that said Letters Patent is hereby corrected as shown below:

Column 16,

Line 43, "exhausted from a tap" should read --exhausted from a top--.

Signed and Sealed this

Thirteenth Day of May, 2008

JON W. DUDAS
*Director of the United States Patent and Trademark Office*